United States Patent

[11] 3,566,119

| | | | |
|---|---|---|---|
| [72] | Inventor | Edward V. Lewis | |
| | | Newport Beach, Calif. | |
| [21] | Appl. No. | 673,457 | |
| [22] | Filed | Oct. 6, 1967 | |
| [45] | Patented | Feb. 23, 1971 | |
| [73] | Assignee | California Computer Products, Inc. | |
| | | Anaheim, Calif. | |

[54] INFRARED SCANNING DEVICE USING A SPHERICAL LENS
2 Claims, 4 Drawing Figs.

[52] U.S. Cl. ................................................. 250/83.3,
250/52, 250/219
[51] Int. Cl. .................................................... G01j 1/42
[50] Field of Search ........................................... 250/83.3
(IR), 71.5 (S), 219 (DOC)

[56] References Cited
UNITED STATES PATENTS

| 2,237,193 | 4/1941 | Mobsby | 250/83.3 |
|---|---|---|---|
| 2,936,886 | 5/1960 | Harmon | 250/219UX |
| 2,950,799 | 8/1960 | Timms | 250/219X |
| 2,951,161 | 8/1960 | Foster et al. | 250/83.3X |
| 3,317,730 | 5/1967 | Hilsum | 250/43.5 |
| 3,084,253 | 4/1963 | McHenry et al. | 250/83.31 |
| 3,412,245 | 11/1968 | Halverson | 250/71.5 |
| 3,436,540 | 4/1969 | Lamorlette | 250/83.31 |

Primary Examiner—James W. Lawrence
Assistant Examiner—Morton J. Frome
Attorney—John A. Duffy ABSTRACT: The scanning of graphically displayed information may be accomplished using infrared energy. The necessary elements include a source of infrared energy, a means for concentrating the energy on a small sample area, and a sensor which is responsive to energy reflected from the sample area. From the standpoint of dynamic response and reliability, a lightweight self-contained source and receiver of infrared energy is required. By changing the focal point of energy concentration the scanning head may be made to function as a detector of distant objects.

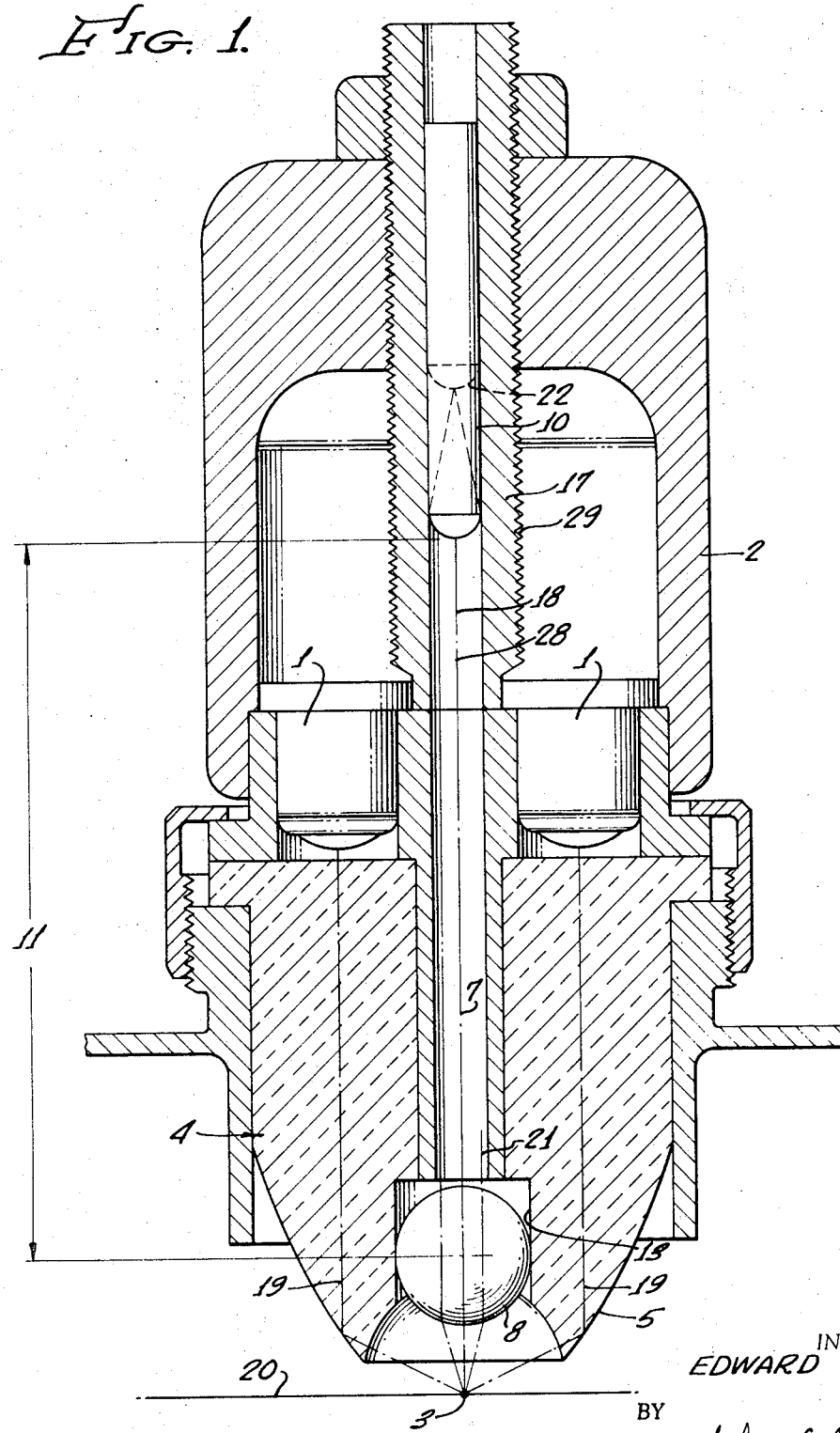

INFRARED SCANNING DEVICE USING A SPHERICAL LENS

BACKGROUND OF THE INVENTION

The conversion of graphically displayed information into digital data for computer processing or for other reasons may be accomplished in numerous ways. Thus it is possible to manually sample an arbitrary number of closely spaced intervals on a given segment of some display and generate therefrom a set of X–Y coordinates, the totality of which will approximate the particular line in question. Alternatively, the sampling process may be carried out automatically using a prescribed searching pattern for keeping track of a particular line. Another method of automatically scanning a given display involves the use of a scanning raster technique wherein the location of each point of cogency is stored in a memory for later processing as required. Irrespective of which system is employed to digitize the graphical data, it is necessary to have an apparatus which is capable of discriminating between the graphical data and the background upon which it is recorded. A paramount requirement for such an apparatus is that it be capable of high resolution in order to detect fine lines and be able to accurately locate the position of light-dark transitions.

Prior art optical scanning devices generally utilize a so-called fiber optic light pipe to transmit the luminous energy to the scanning head in order to avoid the adverse inertial dynamic problems which would arise if the light source were mounted directly on the scanning head. Such light pipes are inefficient conductors of light however, and in addition are easily damaged. Furthermore, it is difficult to achieve high resolution with existing scanners because of the critical alignment problems associated with focusing the reflected energy upon the sensor so as to maintain a reliable congruence between the sensed area and the illuminated area. In addition, existing scanning devices are highly susceptible to ambient lighting conditions — an obviously undesirable characteristic in view of the possibility that the ambient background may not be uniform or that it will vary during the time the scanning process is carried out.

Accordingly, it is an object of the present invention to provide a low inertia optical scanner having a self-contained light source.

A second object of the invention is to provide a high resolution optical scanning head which is insensitive to ambient background lighting.

A further object of the invention is to provide an optical scanning head which does not require precision alignment in order to focus the illuminated area upon an optical sensor.

Other advantages and objects of the present invention will be apparent from the description of the particular embodiment below.

SUMMARY OF THE INVENTION

The present invention comprises an optical scanning head having a self-contained source of infrared energy; a means for concentrating the infrared radiation so as to illuminate a small sample area of the graphical display; and a means for sensing only the infrared energy reflected from the sample area so as to eliminate the deleterious effects of background lighting.

BRIEF DESCRIPTION OF THE DRAWINGS

FIG. 1 shows a cross-sectional view of the operative features of the optical scanning head.

DESCRIPTION OF A PREFERRED EMBODIMENT

Figure 3:
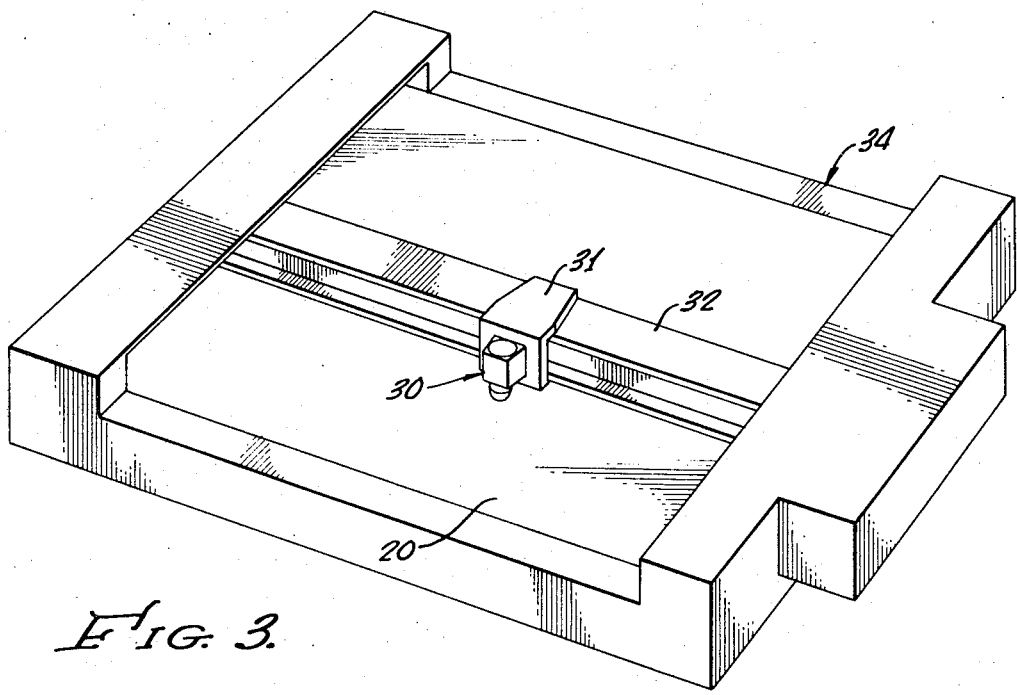
FIG. 3 illustrates the positional arrangement of the scanner in normal operation with a graphical recorder.

FIG. 1 illustrates the operative features of the optical scanning head. Four solid state infrared-emitting diodes 1 are radially deployed about the center axis 18 of the housing 2 so that each has its path of energy transmission 19 parallel with the axis 18 of the housing 2. The energy from the four diodes 1 is concentrated upon a sample area 3 in the plane of the graphical display 20 which is the focal point of the parabolic outer surface 5 of the translucent lense 4. The lense 4 may be made of acrylic or any other material which is transparent to infrared.

Figure 2:
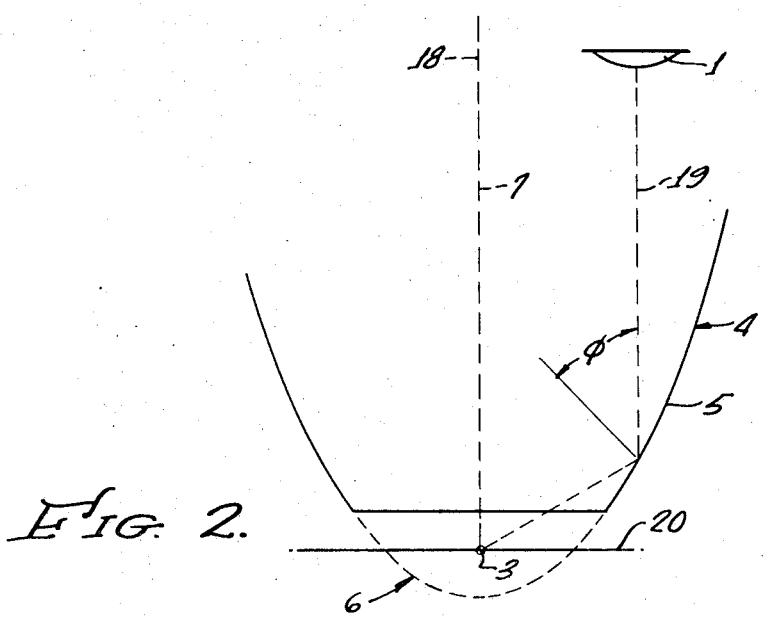
FIG. 2 illustrates in detail the reflection of parallel rays from the parabolic lense.

FIG. 2 illustrates how rays which strike the parabolic surface 5 at greater than the critical angle will be totally reflected. Hence it is unnecessary to provide any external material to the parabolic surface in order to achieve complete reflection for rays entering at an angle equal to or greater than $\Phi_C$ wherein:

$$\text{ARC SIN } \Phi_C = N_1/N$$

where $N_1$ is the index of refraction of the air and $N_4$ is the index of refraction of the lense material. It may thus be observed that all rays which are parallel to the parabolic axis 7 can be made to strike the parabolic segment 5 at greater than the critical angle by appropriately positioning the parabolic vertex 6.

Referring again to FIG. 1, the reflected infrared energy from the sample area 3 is collimated in a beam 21 by the spherical lense 8 which operates to concentrate the reflected energy on the photo sensor 10. The photosensor 10 could conceivably be any device capable of sensing infrared. The texas instrument LS 400 which is illustrated in FIG. 1 contains a conventional lense which together with the spherical lense 8 operates to form a magnified image of the illuminated sample area 3 on its light sensitive junction 22. The output of the sensor is typically an electrical signal, the magnitude of which is indicative of the quantity of light reflected from the sensing area. The sensor is fitted within an opaque sleeve 17 which has its outer surface 29 threaded so that it is compatible with the threaded housing 2. By turning the sleeve with respect to the housing proper focusing may be achieved. It may be observed that the center axis of the four energy sources 1 is coaxial with the optical axis 28 of the photo sensor 10 thus rendering the optical sensitivity of the scanning head independent of the direction in which display information is approached.

The spherical lense 8 should be formed of a material which is transparent to infrared. An ideal material is synthetic ruby, ($C_2OAL_2O$) which is transparent to infrared but relatively opaque to higher frequencies within the visual spectrum thus minimizing the influence of ambient background lighting. In addition, synthetic ruby has a high index of refraction thus making possible extremely short focal lengths and hence high magnification within a short conjugate distance 11. Since the dynamics of any scanning system is sharply limited by the inertia of the scanning head, any saving in size and weight is obviously an advantage. The desirability of employing a spherical lense lies in the fact that it is not necessary to align it with respect to the axis of the sensor 28, i.e., the spherical lense is automatically aligned when it is pressed into a cavity 13 which is concentric with the axis of the sensor 28 and parabolic lense 7. A spherical lense is also desirable from the standpoint of obtaining high magnification since it is relatively easy to manufacture small diameter spheres as opposed to making a conventional lense having a comparable focal length. Since the focal length of spherical lense is proportional to its radius, and since magnification is inversely proportional to focal length, a relatively large magnification and hence high resolution can be achieved using a small, easily manufactured sphere.

By utilizing a source of infrared energy 1 having its peak spectral emission equal to the peak spectral sensitivity of the sensor 10 optimum signal efficiency can be achieved. For the Texas Instruments LS 400 photosensitive diode an excellent match can be realized using a General Electric led 10 emitting diode. By applying short bursts of power to the source 1 and simultaneously sampling the receiver 10 the ratio of signal strength to average power supplied can be greatly enhanced over that which would result if the source were operated continuously. The only criteria for the pulsed mode operation is that if an incremental system is used it be synchronous with the movement of the scanning head, or if a continuously moving system is employed, a sufficiently high pulse frequency be utilized to insure that information is not lost.

FIG. 3 illustrates a typical configuration. The scanning head 3 is positioned above the plane of the graphical display 20 of an appropriate height so as to illuminate the small sample area 3. The scanner 30 is caused to move about its course in either continuous or incremental fashion by the carriage 31 and beam 32 assembly of a graphical recording apparatus 34.

In the case of an incremental device 34, the beam should be turned on and off at a time which coincides with the movement. This may be accomplished by synchronizing the pulse frequency with the actuating frequency of the incremental device 34. The received signal should also be periodically sampled so as to obtain optimum signal to noise ratio. Both the synchronization of the beam and amplifier can be accomplished using electronic switching circuits 31 and 32, the details of which are not shown since they form no part of the present invention.

Figure 4:
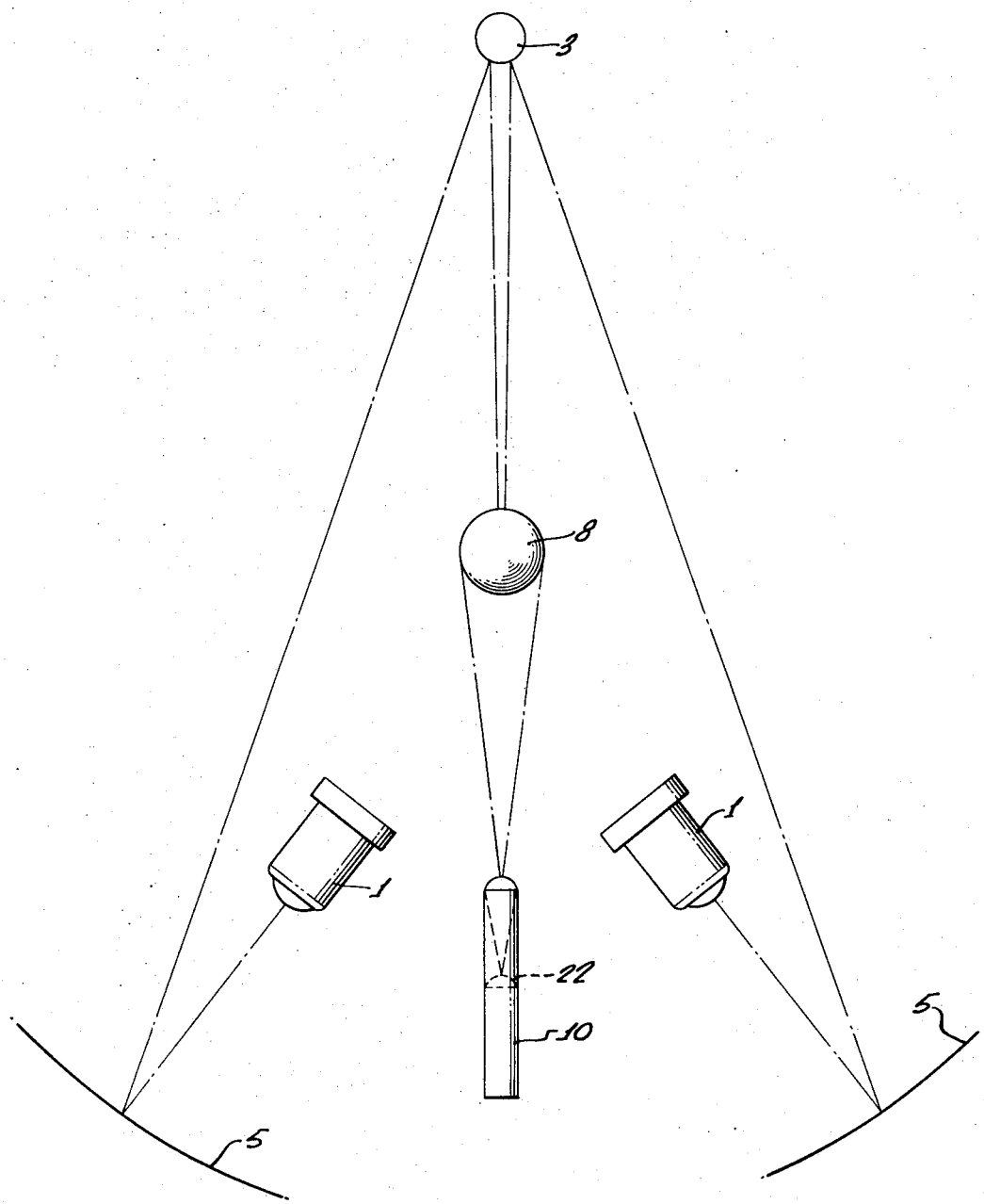
FIG. 4 illustrates how the scanner may be modified to sense remote objects.

It will be apparent that the present invention is not limited in its application to detecting graphical information. Referring to FIG. 4, it may be seen that by changing the focal point of the source and sensor, distant objects may be detected. The basic scanner so modified may thus serve as an infrared radar. In essence the scanning head may be employed to sense the proximity of any obstacle which will reflect infrared energy. Typical applications include a ship radar for detecting other ships or shoreline in a fog; an automobile warning device for sensing the proximity of other autos or road hazards; and the detecting of movement of persons at night, e.g., a burglar alarm or a device for detecting enemy troop movements in battle.

Although a preferred embodiment of the present invention has been shown and described herein, it is understood that the invention is not limited thereto and numerous changes and substitutions may be made without departing from the spirit of the invention.

I claim:

1. An apparatus for sensing graphically displayed information comprising: a cylindrical housing; a plurality of infrared generators within said cylindrical housing equally displaced with respect to the axis of said cylinder and to each other, said generators to be oriented to have their optical axis parallel with the axis of said cylinder; a transparent lense having a cavity concentric with its optical axis and concentric with the axis of said cylinder, said transparent lense having a parabolic outer surface for concentrating infrared energy so as to illuminate a small area of said graphical display with infrared energy; a sensor concentric with said cylinder axis; a spherical lense within said cavity for collimating the reflected infrared energy; a second lense operating in conjunction with said spherical lense for forming a magnified image of said area illuminated; a sensor concentric with said cylinder axis and responsive to the magnified image formed by said spherical lense and said second lense so as to determine the relative reflectance of said illuminated area.

2. A system for scanning graphical displays comprising: a movable scanning head having a means for generating an infrared beam of radiation and a means for sensing reflected infrared energy, said movable head comprising: a cylindrical housing; a plurality of infrared generators within said cylindrical housing equally displaced with respect to the axis of said cylinder and to each other, said generators to be oriented to have their optical axis parallel with the axis of said cylinder; a transparent lense having a cavity concentric with its optical axis and concentric with the axis of said cylinder, said transparent lense having a parabolic outer surface for concentrating infrared energy so as to illuminate a small area of said graphical display with infrared energy; a sensor concentric with said cylinder axis; a spherical lense within said cavity for collimating the reflected infrared energy; a second lense operating in conjunction with said spherical lense for forming a magnified image of said area illuminated; a sensor concentric with said cylinder axis and responsive to the magnified image formed by said spherical lense and said second lense so as to determine the relative reflectance of said illuminated area; means for incrementally moving said scanning head with respect to said graphical display; and means for pulsing said infrared generator and said infrared sensor in synchronization with said incremental movements.